US010367752B2

(12) United States Patent
Gupta et al.

(10) Patent No.: US 10,367,752 B2
(45) Date of Patent: Jul. 30, 2019

(54) DATA PACKET MANAGEMENT IN A MEMORY CONSTRAINED ENVIRONMENT

(71) Applicant: International Business Machines Corporation, Armonk, NY (US)

(72) Inventors: Sachin Gupta, Bangalore (IN); Venkatesh Sainath, Bangalore (IN); Basabjit Sengupta, Bangalore (IN); Amit J. Tendolkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/356,535

(22) Filed: Nov. 18, 2016

(65) Prior Publication Data

US 2018/0145921 A1 May 24, 2018

(51) Int. Cl.
*H04L 12/00* (2006.01)
*H04L 12/863* (2013.01)
*H04L 29/08* (2006.01)

(52) U.S. Cl.
CPC ............ *H04L 47/625* (2013.01); *H04L 67/04* (2013.01); *H04L 67/12* (2013.01)

(58) Field of Classification Search
CPC .... H04L 63/0428; H04L 14/433; H04L 49/90
USPC ................. 709/236, 220; 370/229
See application file for complete search history.

(56) References Cited

U.S. PATENT DOCUMENTS

| | | | | |
|---|---|---|---|---|
| 5,361,372 A | * | 11/1994 | Rege | H04L 12/433 370/229 |
| 5,367,643 A | * | 11/1994 | Chang | G06F 5/06 370/412 |
| 5,530,902 A | * | 6/1996 | McRoberts | G06F 13/30 370/389 |
| 6,038,216 A | * | 3/2000 | Packer | H04L 1/0002 370/231 |
| 6,104,929 A | * | 8/2000 | Josse | H04W 48/17 455/445 |
| 6,597,699 B1 | * | 7/2003 | Ayres | H04L 47/10 370/400 |
| 6,687,220 B1 | * | 2/2004 | Ayres | H04L 47/10 370/229 |
| 6,738,371 B1 | * | 5/2004 | Ayres | H04L 47/10 370/352 |
| 6,990,195 B1 | * | 1/2006 | LeBlanc | G10L 25/90 379/406.08 |
| 7,012,893 B2 | * | 3/2006 | Bahadiroglu | H04L 29/06 370/231 |
| 7,308,609 B2 | | 12/2007 | Dickenson et al. | |

(Continued)

*Primary Examiner* — Frantz Coby
(74) *Attorney, Agent, or Firm* — Nathan M. Rau

(57) ABSTRACT

Disclosed aspects relate to data packet management in a memory-constrained environment. A data packet having a command may be received by a first device. The data packet may be processed by the first device using the command. A first portion of processed data may be loaded in the memory component by the first device. The first portion of processed data may be communicated by the first device to a second device. A second portion of processed data may be loaded in the memory component by the first device. The second portion of processed data may be communicated by the first device to the second device. A trailer may be loaded in the memory component by the first device. The trailer may be communicated by the first device to the second device.

20 Claims, 5 Drawing Sheets

(56) References Cited

U.S. PATENT DOCUMENTS

| | | | |
|---|---|---|---|
| 7,339,892 B1 * | 3/2008 | Engwer | H04L 47/10 |
| | | | 370/230 |
| 9,225,807 B2 | 12/2015 | Pope et al. | |
| 2004/0215814 A1 * | 10/2004 | Park | H04L 49/90 |
| | | | 709/236 |
| 2006/0078120 A1 * | 4/2006 | Mahendran | H04L 63/0428 |
| | | | 380/255 |

* cited by examiner

DATA PACKET MANAGEMENT IN A MEMORY CONSTRAINED ENVIRONMENT

BACKGROUND

This disclosure relates generally to computer systems and, more particularly, relates to data packet management in a memory-constrained environment. Computer components may exchange data packets to facilitate device communication and instruction execution. The memory available for data packet exchange and storage may be limited. As computer component communication increases, the need for data packet management in a memory constrained environment may increase.

SUMMARY

Aspects of the disclosure relate to data packet management in a memory-constrained environment. Data packet status information may be sent at the end of the data packet to facilitate dynamic communication of response data between computing devices. A first processor may receive a data packet from a second processor, and begin processing the data packet. Response data may be generated and dynamically sent back to the second processor without a header. Upon completion of data packet processing, the first processor may add a trailer at the end of the response packet together with status information and response codes for the processed data packet.

Disclosed aspects relate to data packet management in a memory-constrained environment. A data packet having a command may be received by a first device. The first device may include a memory component having an actual memory size which is less than a threshold memory size. The data packet may be processed by the first device using the command. A first portion of processed data may be loaded in the memory component by the first device. The first portion of processed data may be communicated by the first device to a second device. A second portion of processed data may be loaded in the memory component by the first device. The combined size of the first and second portions of processed data may exceed the actual memory size. The second portion of processed data may be communicated by the first device to the second device. A trailer may be loaded in the memory component by the first device. The trailer may be communicated by the first device to the second device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
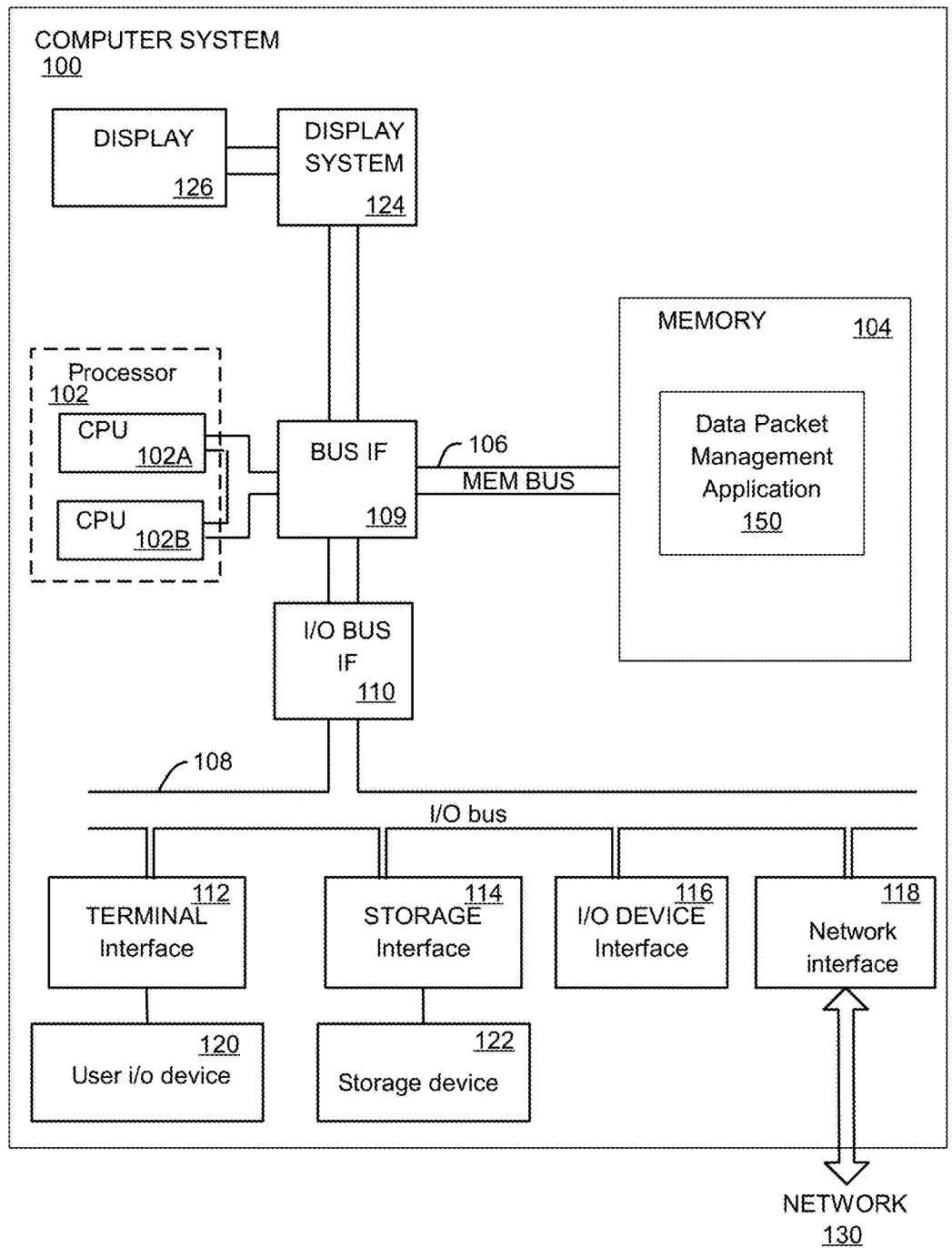
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to data packet management in a memory-constrained environment. Data packet status information may be sent at the end of the data packet to facilitate dynamic communication of response data between computing devices. A first processor (e.g., self-boot engine) may receive a data packet from a second processor (e.g., service processor), and begin processing the data packet. Response data may be generated and dynamically sent back to the second processor without a header. Upon completion of data packet processing, the first processor may add a trailer (e.g., header-like) at the end of the response packet together with status information (e.g., failure data) and response codes for the processed data packet. Transmission of such information at the end of a packet may be associated with memory usage efficiency, communication reliability, and error management.

Intra-component communication is one method of transmitting data and information between different devices in computer systems. Aspects of the disclosure relate to the recognition that, in some situations, the devices and components of computer systems may operate in environments with limited amounts of memory. As an example, in multi-processor systems such as distributed device driver environments, the memory of remote device drivers may be used for end-user applications, leaving little memory for communication with other computer components (e.g., service processors). Accordingly, aspects of the disclosure relate to processing data packets in discrete portions and streaming them back to host devices in dynamic fashion without a header to facilitate (e.g., expedite) delivery of response data information. A trailer including validity information (e.g., results of data packet evaluations) may be sent to host devices subsequent to transmission of the processed data for a data packet. In this way, computer components may handle and process data packets having sizes larger than available device memory (e.g., data packets are processed in portions) and data packet payloads may be provided to host devices immediately upon completion or processing (e.g., without a header).

Aspects of the disclosure relate to a system, method, and computer program product for data packet management in a memory-constrained environment. A data packet having a command may be received by a first device. The first device may include a memory component having an actual memory size which is less than a threshold memory size. The first device may use the command to process the data packet. In embodiments, an error event may be detected with respect to processing the data packet, and a trailer may be constructed to indicate the error event. The first device may load a first portion of processed data in the memory component. The first device may communicate the first portion of processed data to a second device. In embodiments, the first portion of processed data may be constructed and communicated without a header. In embodiments, the first portion of processed data may be constructed and communicated without a set of validity information.

The first device may load a second portion of processed data in the memory component. The combined size of the first and second portions of processed data may exceed the actual memory size. The first device may communicate the second portion of processed data to the second device. In embodiments, the second portion of processed data may be communicated separate from the trailer, and the trailer may be communicated subsequent to the second portion of processed data. The first device may load the trailer in the memory component, and communicate the trailer to the second device. In embodiments, a control command to discard the first and second portions of the processed data may be provided in the trailer. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a data packet management application 150. In embodiments, the data packet management application 150 may include instructions or statements that execute on the processor 102 or instructions or statements that are interpreted by instructions or statements that execute on the processor 102 to carry out the functions as further described below. In certain embodiments, the data packet management application 150 is implemented in hardware via semiconductor devices, chips, logical gates, circuits, circuit cards, and/or other physical hardware devices in lieu of, or in addition to, a processor-based system. In embodiments, the data packet management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
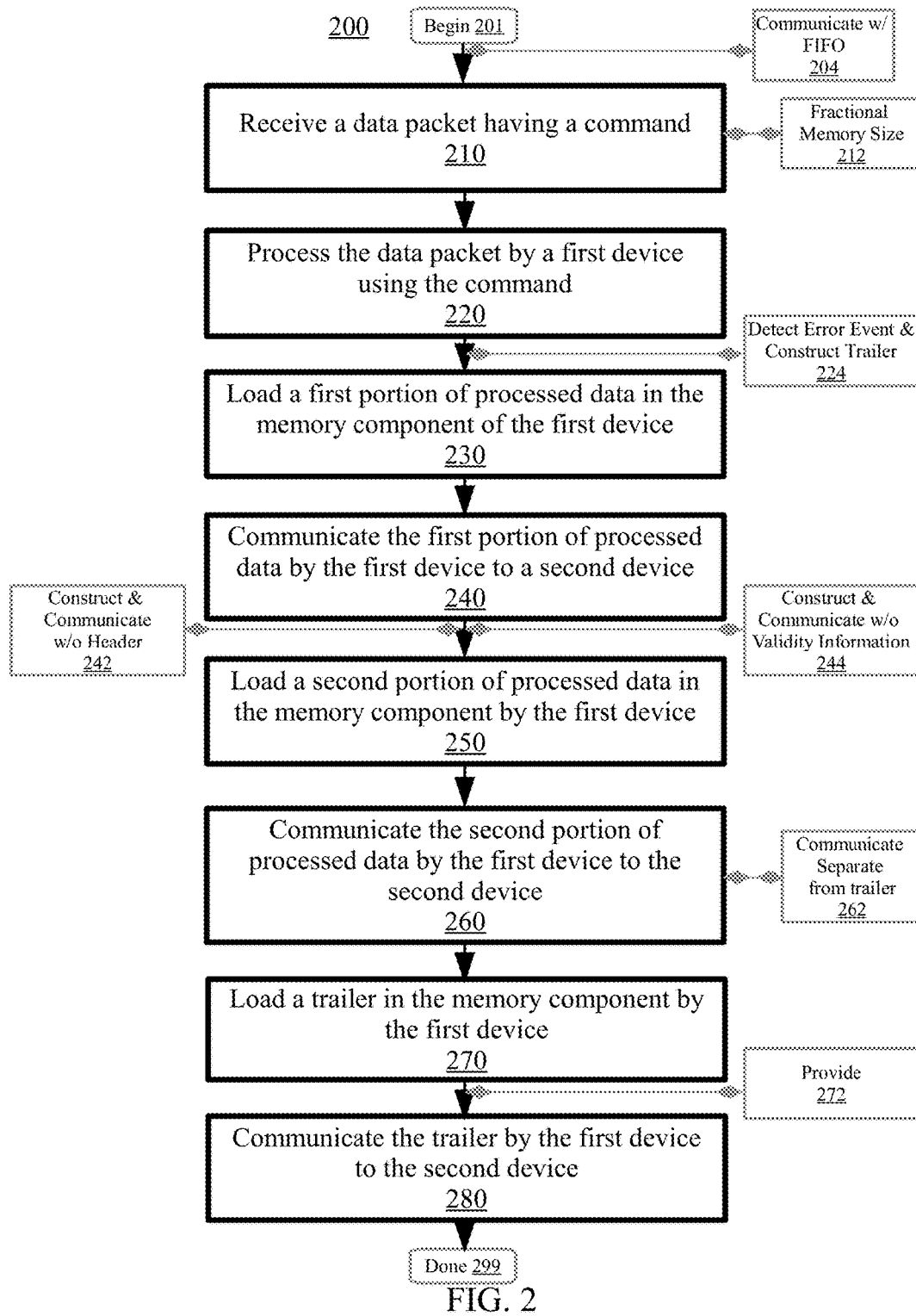
FIG. 2 is a flowchart illustrating a method for data packet management in a memory-constrained environment, according to embodiments.

FIG. 2 is a flowchart illustrating a method 200 for data packet management in a memory-constrained environment, according to embodiments. Aspects of FIG. 2 relate to dynamically processing and communicating portions of a data packet between a first device and a second device together with a trailer transmitted subsequent to the portions of the data packet. The data packet may include a formatted unit of data carried by a packet-switched network from an origin (e.g., second device) to a destination (e.g., first device). The data packet may be structured and communicated based on one or more communication protocols. In embodiments, aspects of the disclosure relate to the communication of data packets between computing devices (e.g., service processors, host processors, self-boot engines) in a multi-processor distributed device driver environment. The data packet may be structured with a trailer at the end of the packet to facilitate dynamic transmission of response data (e.g., in response to processing of the data packet). Transmission of a trailer at the end of a packet may be associated with memory usage efficiency, communication reliability, and error management. The method 200 may begin at block 201.

In embodiments, aspects of the disclosure relate to communicating a first and second portion of processed data (e.g., of a data packet) and a trailer using a first-in-first-out buffer (FIFO) at block 204. The first and second portions of processed data and the trailer may be communicated between a first device and a second device using a FIFO technique. Generally, the FIFO buffer may include a data structure configured to facilitate data transmission between multiple computing devices. Data elements (e.g., packets, data payloads) may be stored in a hold queue, and the oldest (first) data element may be processed first, such that the data elements may exit the FIFO buffer system in the order in which they were received. In embodiments, the FIFO buffer may include a synchronous FIFO (e.g., same clock frequency used for both data element reading and writing) or an asynchronous FIFO (e.g., different clock frequencies used for data element reading and writing, respectively). In embodiments, the FIFO buffer may be configured to transmit first and second portions of processed data together with a trailer between a first device (e.g., self-boot engine) and a second device (e.g., service processor). As an example, data elements (e.g., portions of a data packet) may enter in the FIFO buffer in a first position (e.g., back of the queue), and rotate to lower positions (e.g., front of the queue) as new data elements enter. With each rotation, the data element in the front position of the queue may be dequeued (e.g., ejected, exit) from the FIFO buffer and transmitted to a receiving device (e.g., service processor, self-boot engine). In this way, data packets may be processed by the FIFO buffer in the order in which they were received. Other types of FIFO buffers and FIFO techniques are also possible.

At block 210, a data packet having a command may be received by a first device. The first device may include a memory component having an actual memory size which is less than a threshold memory size. Generally, receiving can include collecting, retrieving, detecting, sensing, capturing, or otherwise accepting delivery of the data packet. As described herein, the data packet may include a formatted unit of data transmitted from an origin location (e.g., second device) to the first device. The first device may include a hardware device (e.g., server, processor) or virtual computing unit (e.g., virtual machine, logical partition) configured to perform processing operations on data packets. As examples, the first device may include a compute node within a distributed device driver environment, a processor in a multiprocessor system, a boot device, a server, baseboard management controller, or other type of computing device. In embodiments, the first device may include a self-boot engine in a distributed device driver environment that is configured to perform the command indicated by the data packet. The command may include a set of instructions, requests, directions, or other directive to the first device. For instance, the command may include a request to send or install a peripheral device driver to a specified computing device. As an example, in certain embodiments, receiving may include accepting a command from a service processor communicatively connected with the first device that indicates that a network driver is requested for installation on a particular computing device. Other methods of receiving a data packet having a command are also possible.

In embodiments, aspects of the disclosure relate to a first device including a memory component having an actual size which is less than a threshold memory size at block 212. The memory component may include a hardware device having a portion of volatile or non-volatile memory configured for data storage (e.g., of data packets). As examples, the memory component may include a cache, hard disk, flash memory, or the like. Aspects of the disclosure relate to the recognition that, in some situations, the memory available for data packet communication between processors may be limited. For instance, the memory component of the first device may have an actual size (e.g., usable size, capacity) that is less than a threshold memory size (e.g., benchmark capacity, size of a data packet). As an example, the memory component of the first device may have an actual size of 96 kilobytes, and the threshold memory size may be 1 megabyte. In embodiments, the threshold memory size may be a fraction (e.g., portion, division, percentage, division) of the size of the data packet. For instance, the threshold memory size may include half the size of the data packet, a fourth the size of the data packet, a tenth the size of the data packet, or other fractional value relative to the size of the data packet. As an example, in a situation in which the data packet is 4 megabytes, the threshold memory size may be 2 megabytes (e.g., one half the size of the data packet). Other types of fractional relationships between the actual size of the memory component, the threshold size, and the data packet are also possible.

At block 220, the data packet may be processed by the first device using the command. Generally, processing can include analyzing, assessing, evaluating, carrying-out, investigating, or otherwise examining the data packet using the command. In embodiments, processing may include performing a series of operations on the data packet based on the command. For instance, the command may specify one or more operations for execution on the data packet. As an example, the command may specify that the first device perform a verification operation on the data packet to evaluate the contents of the data packet prior to installation of a driver. The payload of the data packet may be examined, and the first device may determine the validity (e.g., functionality, correctness) of each byte of data included in the packet. In embodiments, processing may include using a self-boot engine (SBE) to analyze a hardware access operation (e.g., chip-op) request received from a service processor, and generate a set of response data (e.g., indicating an assessment/evaluation of the contents of the data packet) for relaying to a service processor. In certain embodiments, processing may include performing a read operation (e.g., loading), write operation (e.g., storing), get operation (e.g., fetching, retrieving), or set operation (e.g., configuring a parameter) specified by the command on the contents of the data packet. Other methods of processing the data packet by the first device using the command are also possible.

In embodiments, an error event may be detected with respect to processing the data packet and a trailer may be constructed to indicate the error event at block 224. Generally, detecting can include sensing, recognizing, discovering, identifying, or otherwise ascertaining the error event. The error event may include a bug, glitch, failure, inaccuracy, or other irregularity with respect to the data packet. In embodiments, detecting the error event may include evaluating each byte of a data packet with respect to a set of verification criteria (e.g., payload type, readability, encryption level, formatting), and ascertaining that a subset of bytes do not achieve one or more of the evaluation criterion. As an example, detecting may include parsing the contents of a data packet and identifying a subset of bytes that include corrupted data, a subset of bytes that are missing (e.g., lost during transmission), or bytes that are otherwise associated with an irregularity. In embodiments, in response to detecting the error event, a trailer to indicate the error event may be constructed. Generally, constructing can include generating, assembling, structuring, producing, or otherwise creating the trailer. The trailer may include information regarding the length of the packet (e.g., size), synchronization data (e.g., network matching), packet number (e.g., placement in a sequence), communication protocol (e.g., packet type), destination address (e.g., network address to which the packet is being sent), originating address (e.g., where the packet came from), and other information regarding the data packet. In embodiments, the trailer may be structured to indicate the error event. For instance, the trailer may include an evaluation report that specifies the results of the evaluation performed on the data packet by the first device. As an example, the evaluation report included in the trailer may maintain a record of the bytes of a data packet together with an assessment result for each byte. Bytes that are associated with error events may be marked, highlighted, annotated or otherwise tagged to indicate the type of the error event (e.g., corruption, data loss), the severity of the error event (e.g., mild, moderate, critical), the time and date the error event was encountered (e.g., January 14th, 2:19 PM) and other information regarding the error event. Other methods of detecting the error event and constructing the trailer to indicate the error event are also possible.

At block 230, a first portion of processed data may be loaded in the memory component of the first device. Generally, loading can include importing, ingesting, extracting, reading, saving, or otherwise storing the first portion of processed data in the memory component of the first device. The first portion of processed data may include a part, segment, section, chunk, excerpt, or other subset of the data packet processed by the first device. In embodiments, loading may include performing a read operation on a segment of the data packet to save the first portion of data to a memory address of the memory component of the first device. In embodiments, loading may include importing the first portion of processed data into the memory component of the first device for utilization to facilitate performance of the command indicated by the data packet. For instance, in embodiments, a portion of the data packet that indicates instructions for execution of a particular operation may be loaded into the memory component of the device (e.g., and a portion of the data packet that is not relevant to execution of the operation may not be loaded). As an example, a command that specifies the name of a particular device driver (e.g., host controller adapter driver version 2.03.4) as well as the installation destination (e.g., E:\Program Files\ACMEHardwareManager) may be loaded into the memory component of the first device to facilitate installation of the specified device driver to the specified network location. Other methods of loading the first portion of processed data in the memory portion of the first device are also possible.

At block 240, the first portion of processed data may be communicated by the first device to a second device. Generally, communicating can include sending, relaying, conveying, transferring, delivering, or otherwise transmitting the first portion of processed data to the second device. The second device may include a hardware device (e.g., server, processor) or virtual computing unit (e.g., virtual machine, logical partition) configured to receive the processed data packets (e.g., first portion, second portion) from the first device. As examples, the second device may include a compute node within a distributed device driver environment, a processor in a multiprocessor system, a boot device, a server, baseboard management controller, or other type of computing device. In embodiments, the second device may include a service processor configured to manage a set of peripheral devices of a network. For instance, the second device may be configured to monitor the physical and logical configuration of compute nodes, network servers, and other hardware devices (e.g., using a set of sensors to measure temperature, humidity, power-supply voltage, fan speeds, operating system functions, software diagnostics, driver versions), and request the execution of operations (e.g., device driver installations) with respect to various computing devices. In embodiments, communicating may include enqueuing the first portion of data in a FIFO buffer for transmission to the second device. In certain embodiments, communicating may include transferring the saved assets pertaining to the first portion of processed data from the memory component of the first device to a memory component of a second device, and removing (e.g., erasing, deleting, flushing) the first portion of data from the first device. In embodiments, communicating may include streaming the first portion of data from the first device to the second device in a dynamic fashion. Other methods of communicating the first portion of processed data from the first device to the second device are also possible.

In embodiments, the first portion of processed data may be constructed and communicated without a header at block 242. As described herein, aspects of the disclosure relate to the recognition that processing and transmitting data packets in a dynamic fashion without a header may facilitate data packet management in a memory-constrained environment. Accordingly, in embodiments, the first portion of processed data may be structured and transmitted without inclusion of a header. Generally, constructing can include generating, organizing, assembling, arranging, formatting, or otherwise structuring the first portion of processed data without a header. Such a feature may include a set of structured information that describes the type, content, protocols, and other information for a data packet. In embodiments, constructing the first portion of processed data without a header may include identifying information regarding the length of the packet, synchronization data, packet number, communication protocol, destination address, originating address, and other information regarding the data packet (e.g., data that may typically be placed in a header) and generating a trailer including the identified information for transmission subsequent to processing of the data packet by the first device. In embodiments, the first portion of processed data may be communicated without a header. Generally, communicating can include sending, relaying, conveying, transferring, delivering, or otherwise transmitting the first portion of processed data without a header. In embodiments, communicating the first portion of processed data without a header may include using a data streaming protocol (e.g., real-time streaming protocol) to stream the first portion of processed data from the first device to the second device without including the header. In this way, data may be processed by the first device and relayed back to the second device in-real time without storage of an entire data packet in the memory component of the first device. Other methods of constructing and communicating the first portion of processed data without a header are also possible.

In embodiments, the first portion of processed data may be constructed and communicated without a set of validity information at block 244. As described herein, aspects of the disclosure relate to the recognition that processing and transmitting data packets in a dynamic fashion without a set of validity information may facilitate data packet management in a memory-constrained environment. Accordingly, in embodiments, the first portion of processed data may be structured and transmitted without inclusion of a set of validity information. Generally, constructing can include generating, organizing, assembling, arranging, formatting, or otherwise structuring the first portion of processed data without the set of validity information. The set of validity information may include data that indicates the result of an evaluation, assessment, or examination performed with respect to the first portion of processed data. For instance, the set of validity information may indicate which bytes of the first portion of processed data have been verified to be functional, which bytes have been lost (e.g., during transmission), which bytes are corrupt, and the like. In embodiments, constructing the first portion of processed data without the set of validity information may include storing the set of validity information in a trailer for transmission (e.g., to a second device) subsequent to processing of the data packet by the first device. In embodiments, the first portion of processed data may be communicated without the set of validity information. Generally, communicating can include sending, relaying, conveying, transferring, delivering, or otherwise transmitting the first portion of processed data without the set of validity information. In embodiments, communicating may include maintaining the set of validity information in the memory component of the first device, and streaming the first portion of processed data from the first device to the second device without the set of validity information (e.g., the validity information may be included in a trailer configured to be transmitted after processing of the entire data packet has completed). In this way, data may be processed by the first device and relayed back to the second device in real-time without storage of an entire data packet in the memory component of the first device. Other methods of constructing and communicating the first portion of processed data without the set of validity information are also possible.

At block 250, a second portion of processed data may be loaded in the memory component of the first device. The combined size of the first and second portions of processed data may exceed the actual memory size. Generally, loading can include importing, ingesting, extracting, reading, saving, or otherwise storing the second portion of processed data in the memory component of the first device. As described herein, aspects of the disclosure relate to facilitating processing of data packets in a memory constrained environment. Accordingly, in embodiments, aspects of the disclosure relate to splitting (e.g., dividing, breaking) a data packet into two or more portions such that each portion may be processed individually by a first device and communicated to a second device without a header. The second portion of processed data may include a part, segment, section, chunk, excerpt, or other subset of the data packet processed by the first device. As described herein, the combined size of the second portion and the first portion of processed data may exceed the actual memory size of the memory component of the first device (e.g., a first portion of 1200 bytes and a second portion of 800 bytes may exceed an actual memory size of 1500 bytes). In embodiments, loading may include extracting a segment of the data packet that was not included in the first portion of processed data, and saving the extracted segment in the memory component of the first device. Consider the following example. The memory component of the first device may have an actual memory size of 1000 bytes. In a situation in which the first device loaded and communicated a first portion of 700 bytes of a data packet having a total size of 1200 bytes, a second portion of 500 bytes (e.g., the remainder of the data packet) may be extracted and saved in the memory component of the first device. In this way, data packets having sizes larger than the memory component of the first device may be loaded and processed by the first device in discrete portions. Other methods of loading the second portion of data in the memory component of the first device are also possible.

At block 260, the second portion of processed data may be communicated by the first device to the second device. Generally, communicating can include sending, relaying, conveying, transferring, delivering, or otherwise transmitting the second portion of processed data to the second device. As described herein, the second device may include a hardware device (e.g., server, processor) or virtual computing unit (e.g., virtual machine, logical partition) configured to receive the processed data packets (e.g., first portion, second portion) from the first device. As an example, the second device may include a service processor configured to manage a set of peripheral devices of a network. In embodiments, communicating may include performing a write operation to queue the second portion of data in a FIFO buffer for transmission to the second device. As new data elements enter, the second portion of data may rotate to the front of the FIFO buffer, at which point it may be dequeued and streamed to the second device (e.g., using a stream communication protocol). In embodiments, the second portion of data may be communicated separate from a trailer at block 262. As described herein, aspects of the disclosure relate to generating and transmitting a trailer including information (e.g., response data, evaluation report, validity information) regarding a processed data packet. Accordingly, in embodiments, the second portion of processed data may be communicated to the second device independently (e.g., isolated from the trailer) and in advance of the trailer. For instance, the second portion of processed data and the trailer may be maintained in separate data packages, and be transmitted to the second device at different times. Other methods of communicating the second portion of processed data to the second device are also possible.

At block 270, the trailer may be loaded in the memory component by the first device. Generally, loading can include importing, ingesting, extracting, reading, saving, or otherwise storing the trailer in the memory component by the first device. As described herein, aspects of the disclosure relate to constructing a trailer to indicate information regarding the length of the packet, response data (e.g., evaluation information), validity information, synchronization data, destination/origination address, and other information pertaining to a data packet. In embodiments, the trailer may replace a header for the data packet, and be communicated subsequent to transmission of the first and second portion of processed data. In embodiments, loading the trailer in the memory component of the first device may include identifying the header-like information received together with the data packet (e.g., from the second device) and storing the header-like information together with the trailer at a designated memory address within the memory component. As an example, trailer information indicating a packet length of 1400 bytes, response data indicating the validity status of each evaluated byte, a specified communication protocol of a FIFO-based streaming protocol, an origination Internet Protocol (IP) address for the first device, and a destination IP address for the second device may be imported and saved to the memory component of the first device. Other methods of loading the trailer in the memory component by the first device are also possible.

In embodiments, a control command to discard the first and second portions of the processed data may be provided in the trailer at block 272. Generally, providing can include supplying, including, instantiating, offering, initiating, or otherwise making available the control command to discard the first and second portions of the processed data. As described herein, aspects of the disclosure relate to detecting an error event with respect to a data packet, and constructing a trailer to indicate the error event. Accordingly, in embodiments, aspects of the disclosure relate to providing a control command configured to discard all or part of the first and second portions of the processed data. The control command may include an instruction, directive, or other request to delete, erase, exclude, omit, or otherwise remove the first and second portions of the processed data. In embodiments, the control command may be configured to erase the first and second portions of the processed data in their entirety. In embodiments, the control command may be configured to erase a part (e.g., segment, section) of the first and second portions of the processed data. As an example, in response to detecting an error event associated with bytes 234-316 of a data packet (e.g., corruption), the control command may be configured to erase only the bytes of the data packet that are associated with the error event (e.g., bytes 234-316). In certain embodiments, the control command may be configured to delete the first and second portions of the processed data from the memory component of the first device (e.g., subsequent to loading the first and second portions in the memory component). In certain embodiments, the control command may be configured to transmit a request to the second device to discard the first and second portions of the processed data (e.g., subsequent to communication of the first and second portions to the second device). Other types of control commands and methods of deleting the first and second portions of processed data are also possible.

At block 280, the trailer may be communicated by the first device to the second device. Generally, communicating can include sending, relaying, conveying, transferring, delivering, or otherwise transmitting the trailer from the first device to the second device. In embodiments, as described herein, the trailer may be communicated to the second device subsequent to transmission of the first and second portions of processed data. For example, upon completion of processing, loading, and communication operations with respect to both the first portion and the second portion of processed data, the trailer may be loaded into a FIFO buffer for transmission to the second device. In embodiments, the trailer may be communicated to the second device using a streaming protocol to transmit the trailer from the first device to the second device dynamically and in real-time. In certain embodiments, as described herein, the trailer may be transmitted separately from the first and second portions of processed data (e.g., in situations in which the combined size of the trailer and the second portion of processed data exceed the actual size of the memory component). In certain embodiments, the trailer may be communicated together with the second portion of processed data in a unified fashion, such that the trailer is transmitted subsequent to the second portion of processed data (e.g., in situations in which the combined size of the trailer and the second portion of processed data do not exceed the actual size of the memory component). Other methods of communicating the trailer to the second device are also possible.

Consider the following example. A first device including a self-boot engine may receive a data packet having a command to initiate installation of a network card device driver to a designated computing device. The first device may have a memory component with an actual size (e.g., available capacity) of 89 kilobytes, and the data packet may have a total size of 171 kilobytes. The first device may process the data packet using the command. For instance, processing the data packet using the command may include identifying the specified device driver and computing device designated to receive installation of the device driver. In embodiments, processing may include dividing the data packet into one or more portions to facilitate loading into the memory component of the first device. As an example, the data packet may be split into a first portion having a size of 86 kilobytes and a second portion having a size of 85 kilobytes. The first portion of the processed data may be loaded in the memory component of the first device. In embodiments, the data of the first portion may be evaluated by the first device to determine the validity of each byte of data (e.g., whether bytes or functional or corrupt). Upon completion of the evaluation, the first portion of processed data may be communicated to a second device including a service processor. In response to communication of the first portion of processed data, the second portion of processed data may be loaded into the memory component of the first device (e.g., replacing the first portion of processed data) and evaluated. Once evaluation of the second portion of processed data has completed, the second portion may be communicated to the second device (e.g., using a FIFO buffer). In embodiments, as described herein, a trailer containing information regarding the validity status of each byte, origination/destination network addresses, synchronization information, and the like may be generated based on the evaluation of the first portion and the second portion of processed data and loaded into the memory component of the first device. Subsequent to communication of both the first and second portions of processed data, the trailer may be communicated to the second device. In embodiments, in the event that corrupt/irregular data was detected with respect to the first or second portions of processed data, the trailer may instruct the second device to delete all or part of the first or second portions. In the event that no corrupt/irregular data was detected, the trailer may instruct the second device to proceed with driver installation to the designated computing device. Other methods of data packet management are also possible.

Method 200 concludes at block 299. As described herein, aspects of method 200 relate to data packet management in a memory-constrained environment. Aspects of method 200 may provide performance or efficiency benefits for intra-device communication. As an example, devices that have limited memory capacities may manage data packets in discrete portions, such that data packets that have sizes larger than the available device memory may be processed. As another example, placement of header-like information in a trailer for communication subsequent to transmission of the processed data packet may facilitate expedient provision of response data (e.g., evaluation data) for the processed data packet. Altogether, transmission of header-like information at the end of a data packet may be associated with memory usage efficiency, communication reliability, and error management.

Figure 3:
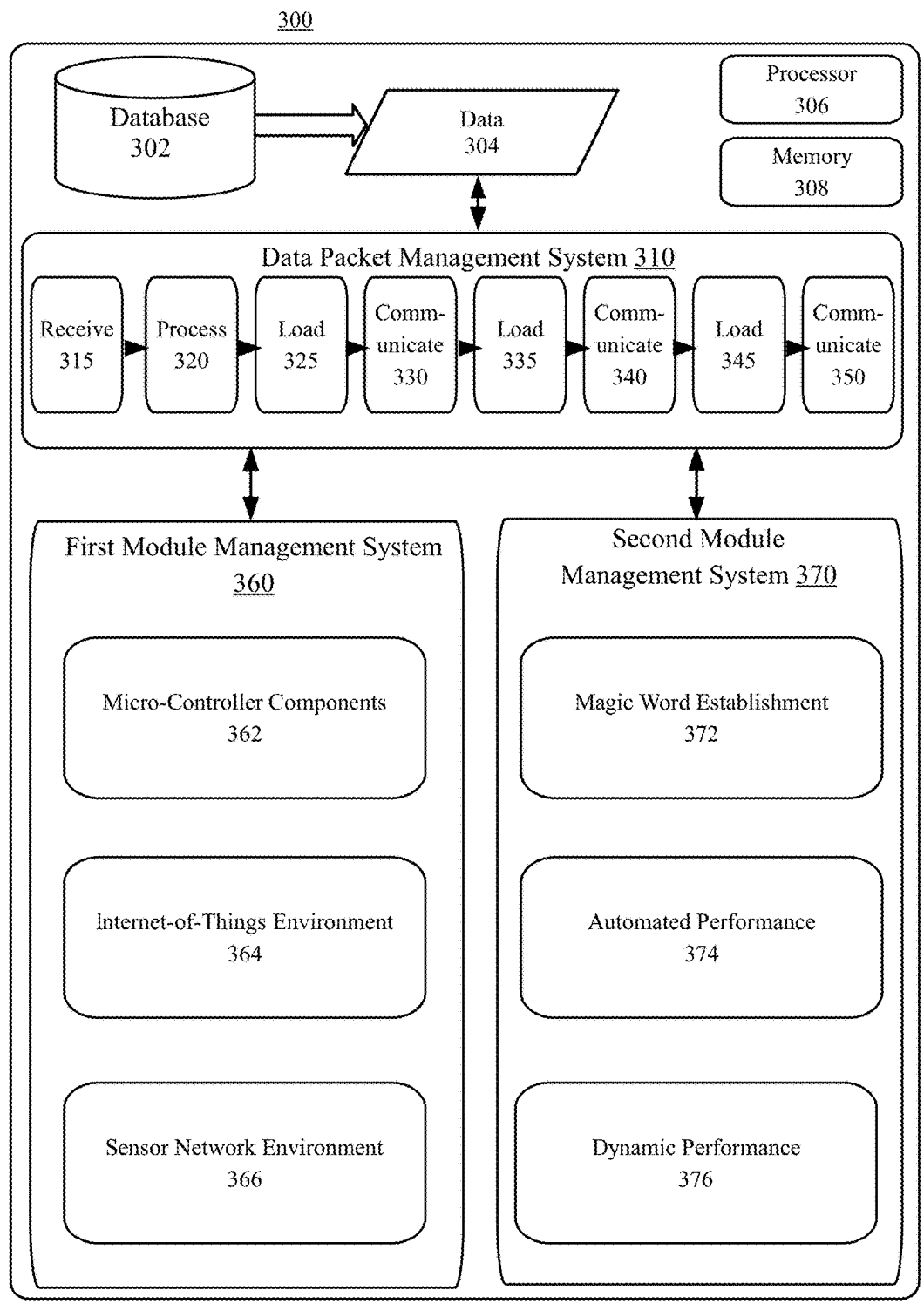
FIG. 3 depicts an example system for data packet management in a memory constrained environment, according to embodiments.

FIG. 3 depicts an example system 300 for data packet management in a memory constrained environment, according to embodiments. Aspects of FIG. 3 relate to managing data packets in a variety of computing environments by dynamically communicating independent portions of processed data followed by a trailer. The example system 300 may include a processor 306 and a memory 308 to facilitate implementation of data packet management. The example system 300 may include a database 302 (e.g., data packet management archive, self-boot engine) configured to maintain data used for data packet management. In embodiments, the example system 300 may include a data packet management system 310. The data packet management system 310 may be communicatively connected to the database 302, and be configured to receive data 304 (e.g., data packets, commands, instructions) related to data packet management. The data packet management system 310 may include a receiving module 315 to receive a data packet having a command, a processing module 320 to process the data packet, a first loading module 325 to load a first portion of processed data in a memory component of the first device, a first communicating module 330 to communicate the first portion of processed data to a second device, a second loading module 335 to load a second portion of processed data in the memory component of the first device, a second communicating module 340 to communicate the second portion of processed data to the second device, a third loading module 345 to load a trailer in the memory component of the first device, and a third communicating module 350 to communicate the trailer to the second device. The data packet management system 310 may be communicatively connected with a first module management system 360 and a second module management system 370 which each include a set of modules for implementing aspects of data packet management.

In embodiments, the first and second devices may include different micro-controller components that execute software at module 362. Generally, the micro-controller components may include integrated circuits having self-contained processor cores, memory, and programmable input/output buses and peripherals. In embodiments, the micro-controller components may be communicatively connected to one another via a FIFO buffer interface in a multi-processor environment. In embodiments, the micro-controller components may be configured to execute software. For instance, the micro-controller components may be configured to run device diagnostic software to monitor the system resource usage, firmware version, and other factors for a set of peripheral devices connected to one or more micro-controller components (e.g., service processors). As another example, the micro-controller components may be configured to run data packet evaluation programs to examine the validity (e.g., whether or not a byte is corrupted) of a set of data packets (e.g., prior to device driver installation). Other types of micro-controller components are also possible.

In embodiments, the memory-constrained environment may include an Internet-of-Things (IoT) environment at module 364. Generally, the IoT environment can include a system of interrelated computing devices, mechanical and digital machines, objects, or individuals associated with unique identifiers to facilitate the transfer of information over a network without requiring human-to-human or human-to-computer interaction. For instance, the first and second devices may include inter-connected devices configured for automated machine-to-machine communication that can be sensed, managed, or controlled remotely using network infrastructure. As examples, the IoT environment may include household appliances (e.g., refrigerators, thermostats, air conditioners), computing devices (e.g., smartphones, tablets, laptops, desktops, servers, smartwatches, televisions), medical devices (e.g., sleep monitors, pacemakers, heart-rate monitors), buildings (e.g., houses, garages, hospitals, banks), automobiles (e.g., cars, planes, trains, buses), commercial/industrial devices, and the like. Other types of IoT environments are also possible.

In embodiments, the memory-constrained environment may include a sensor network environment at module 366. Generally, the sensor network environment may include one or more interconnected sensors for data monitoring. The sensor network environment may include a variety of spatially distributed autonomous sensors to monitor physical or environment conditions (e.g., temperature, sound, pressure) and relay the data to a central processor. The sensor network environment may be configured for bi-directional communication, such that the central processor may direct or regulate the activity of one or more sensors independently. As examples, the sensor network may include thermometers, cameras, microphones, data loggers, network traffic monitors, resource monitors, and the like. In embodiments, the sensor network may include a computer diagnostic tool (e.g., running on a service processor) configured to detect, measure, and record a variety of factors including temperature, humidity, power-supply voltage, fan speeds, operating system functions, software diagnostics, driver versions, and other aspects of network devices. Other types of sensor network environments are also possible.

In embodiments, a magic word which indicates a start of the trailer to the second device may be established at module 372. Generally, establishing can include creating, generating, instituting, registering, or otherwise determining the magic word. Aspects of the disclosure relate to the recognition that, as data packets are processed by the first device and streamed to the second device, it may be desirable to indicate the division between the second portion of processed data and the trailer using a magic word. The magic word may include a marker, tag, flag, or other identifier configured to indicate the break between the second portion of processed data and the trailer (e.g., the start of the trailer). As an example, the magic word may include a particular word or phrase (e.g., abra-kadabra), special character (e.g., number, letter, symbol), password (e.g., opensesame), alpha-numeric code (G98-B327-V834), or the like. In embodiments, establishing may include assigning the magic word to a fixed position at the beginning of the trailer. In certain embodiments, the magic word may be associated with a trailer distance value established at the end of the trailer (e.g., a last byte of transmission from the first device to the second device). The trailer distance value may include an indication of how far (e.g., expressed in bytes, words, time to arrival) the start of the trailer (e.g., magic word) is from the end of the trailer. The second device may be configured to analyze the trailer distance value (e.g., 84 bytes, 28 words), and measure the distance (e.g., in bytes or words) to the magic word at the beginning of the trailer. In response to identifying the magic word at the beginning of the trailer (e.g., based on the trailer distance value), the trailer may be verified and processed by the second device. As an example, the end of the trailer may indicate a trailer distance value of 114 bytes of data (e.g., 114 bytes from the end of the trailer to the magic word at the beginning of the trailer). The second device may parse the received data (e.g., count backward 114 bytes of data) until the magic word is reached. Upon identification of the magic word, the second device may determine the start of the trailer, and proceed to process the trailer. Other methods of establishing the magic word and trailer distance value are also possible.

In embodiments, the receiving of the data packet, the processing of the data packet, the loading of the first portion of processed data, the communicating of the first portion of processed data, the loading of the second portion of processed data, the communicating of the second portion of processed data, the loading of the trailer, the communicating of the trailer, and other steps described herein may each occur in an automated fashion without user intervention at module 374. In embodiments, the receiving, the processing, the loading, the communicating, the loading, the communicating, the loading, the communicating, and other steps described herein may be carried out by an internal data packet management module maintained in a persistent storage device of a local computing device (e.g., self-boot engine, service processor, computer or server connected to a local network). In embodiments, the receiving, the processing, the loading, the communicating, the loading, the communicating, the loading, the communicating, and other steps described herein may be carried out by an external data packet management module hosted by a remote computing device or server (e.g., server accessible via a subscription, usage-based, or other service model). In this way, aspects of data packet management in a memory-constrained environment may be performed using automated computing machinery without manual action. Other methods of performing the steps described herein are also possible.

In embodiments, the receiving of the data packet, the processing of the data packet, the loading of the first portion of processed data, the communicating of the first portion of processed data, the loading of the second portion of processed data, the communicating of the second portion of processed data, the loading of the trailer, the communicating of the trailer, and other steps described herein may each occur in a dynamic fashion to streamline data packet management at module 376. For instance, the receiving, the processing, the loading, the communicating, the loading, the communicating, the loading, the communicating, and other steps described herein may occur in real-time, ongoing, or on-the-fly. As an example, one or more steps described herein may be performed in an ongoing fashion (e.g., portions of data packets may be continuously processed, loaded into the first device, communicated to the second device, and followed by trailers as data packets are sent to the first device) in order to streamline (e.g., facilitate, promote, enhance) data packet management. Other methods of performing the steps described herein are also possible.

Figure 4:
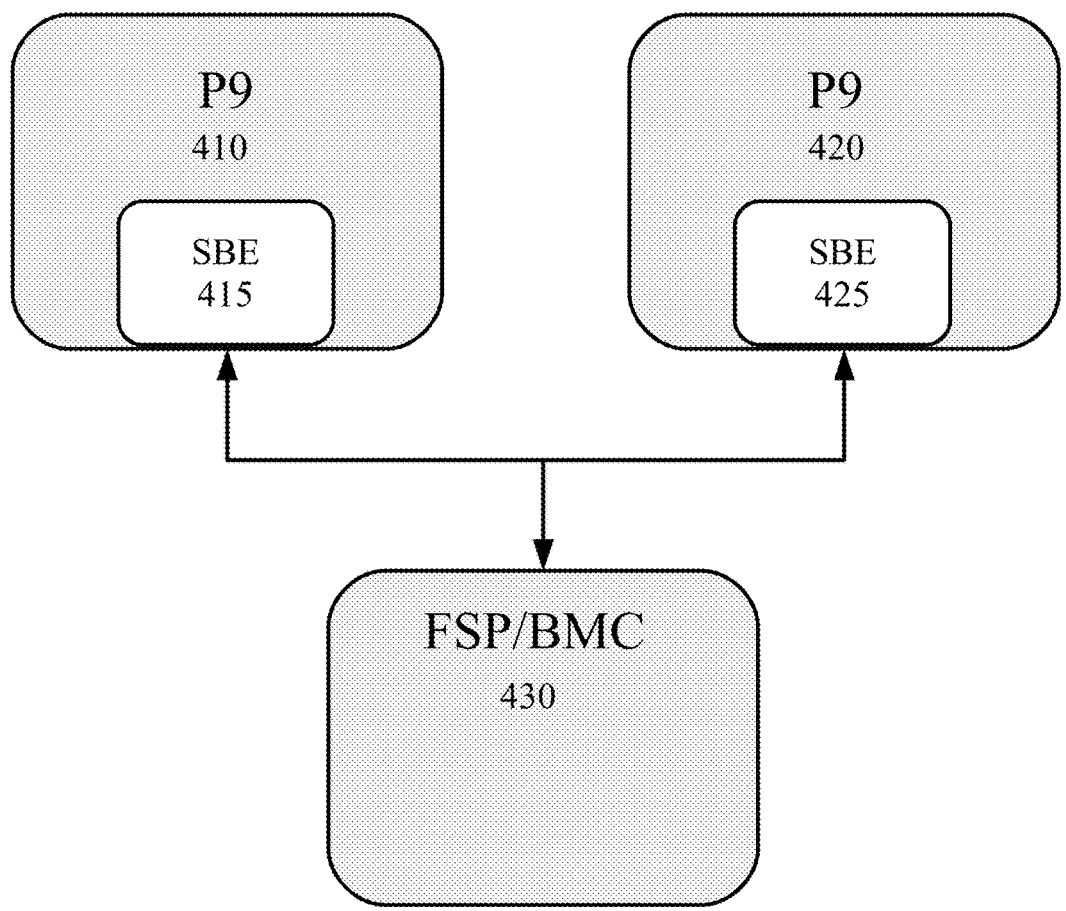
FIG. 4 is a diagram illustrating an example system architecture for data packet management in a memory constrained environment, according to embodiments.

FIG. 4 is a diagram illustrating an example system architecture 400 for data packet management in a memory constrained environment, according to embodiments. Aspects of FIG. 4 relate to a multi-processor system in a distributed device driver environment for data packet management. In embodiments, the system architecture 400 may include a first P9 host processor 410 and a second P9 host processor 420 communicatively connected to each other and to a flexible service processor (FSP) 430 (e.g., in certain embodiments the service processor may include a baseboard management controller). The first host processor 410 may include a first self-boot engine (SBE) 415 and the second host processor 420 may include a second SBE 425. In embodiments, the host processors 410, 420 may host one or more device drivers (e.g., network card drivers, printer drivers, display adapter drivers) configured for access by the service processor 430. Data packets between the service processor 430 and the first and second SBEs 415, 425 of host processors 410, 420 may be exchanged through a bi-directional (e.g., upstream and downstream) FIFO. In certain embodiments, as described herein, the first and second SBEs 415 and 425 may operate within a memory constrained environment (e.g., memory resources may be prioritized for use by end-user applications).

In embodiments, the service processor 430 may send one or more packets (e.g., hardware access operation) having a command to one or more of SBEs 415, 425. The command may require a large amount of data (e.g., greater than 1 MB) to be sent back as part of a response payload (e.g., larger than the available memory space of the SBEs 415, 425). As described herein, aspects of the disclosure relate to splitting data packets into two or more portions for independent processing by one or more of the SBEs 415, 425. The portions of data may be loaded into the memory of one or more of the SBEs 415, 425 and processed. For instance, the portions of data may be evaluated for errors including corruption or data loss. In the event that an error is not detected, the portions of data may be streamed back to the service processor 430 followed by a trailer indicating the contents of the preceding portions, the results of the evaluation, and other information pertaining to the data packet. In the event that an error is not detected, transmission of the portions for the data packet associated with the error may be ceased, and a trailer may be transmitted to the service processor 430 to indicate the error information (e.g., nature of the error, potential causes of the error) and instruct the service processor 430 to discard the previously sent packets (e.g., as the data may be associated with an error, and not be useful). Other methods of using the system architecture 400 to facilitate data packet management are also possible.

Figure 5:
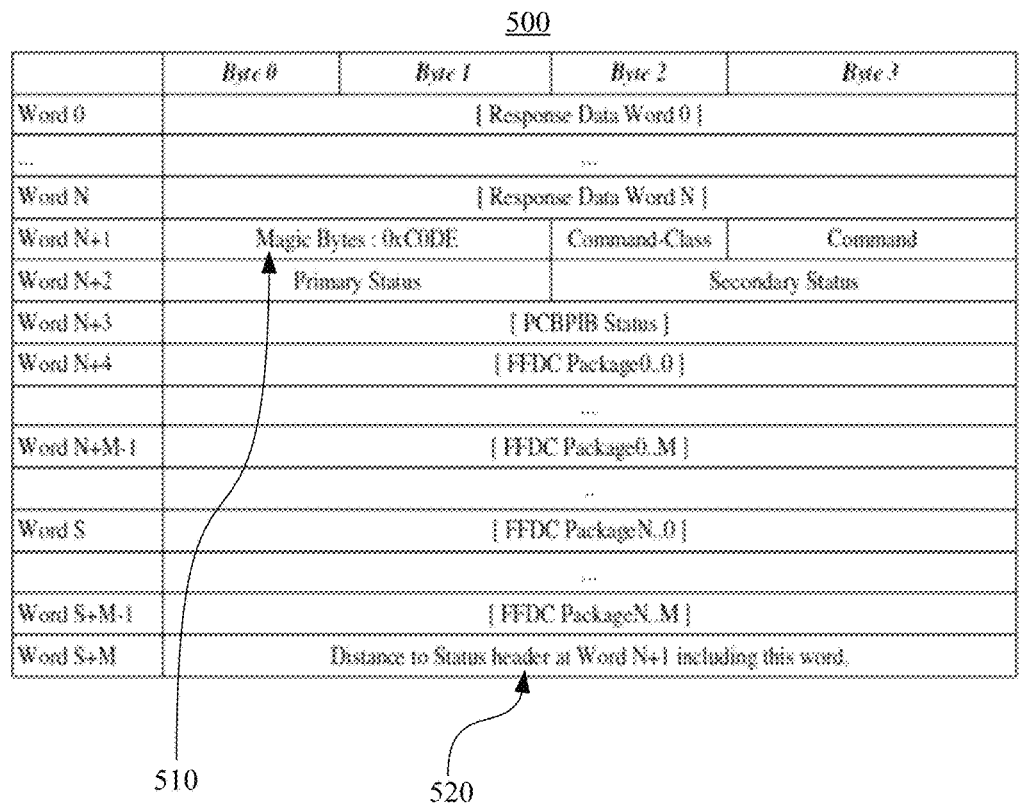
FIG. 5 is a diagram illustrating an example data packet format, according to embodiments.

FIG. 5 is a diagram illustrating an example data packet format 500, according to embodiments. Aspects of FIG. 5 relate to a data packet format 500 including a magic word field 510 and a trailer distance value field 520 to facilitate identification of a trailer transmitted after the payload of a processed data packet. As described herein, aspects of the disclosure relate to transmitting portions of a processed data packet (e.g., processed by a self-boot engine in response to a request from a service processor) in advance of a trailer (e.g., including response header-like information) and any first failure data capture (FFDC) packages generated by the processing. In embodiments, a service processor may receive the processed data packet and the trailer, and use the magic word field 510 and the trailer distance value field 520 to identify the start of the trailer. In embodiments, the magic word field 510 may include a marker, tag, flag, or other identifier configured to indicate the break (e.g., separation) between the processed portion of a data packet and the trailer. For instance, the magic word field 510 may specify a particular hexadecimal number (e.g., 0xCODE) to indicate the start of the trailer. In embodiments, the trailer distance value field 520 may include an indication of how far (e.g., N+1 words) the start of the trailer (e.g., location of the magic word) is from the end of the trailer. The service processor may be configured to analyze the trailer distance value field 520 together with the specified magic word field 510 to identify the start of the trailer. In response to identifying the magic word (e.g., 0xCODE) at the beginning of the trailer (e.g., based on the trailer distance value), the trailer may be verified and processed by the service processor. Other types of data packet formats are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, ondemand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for data packet management in a memory-constrained environment, the memory-constrained environment including a distributed device driver environment, the method comprising:
   receiving, by a first device that is a self boot engine (SBE), the first device including a memory component having an actual memory size which is less than a threshold memory size, a data packet containing a command;
   processing, by the first device using the command, the data packet;
   loading, in the memory component by the first device, a first portion of processed data;
   communicating, by the first device to a second device that is a service processor (SP), the first portion of processed data;
   loading, in the memory component by the first device, a second portion of processed data, wherein a combined size of the first and second portions of processed data exceeds the actual memory size;
   communicating, by the first device to the second device, the second portion of processed data;
   loading, in the memory component by the first device, a trailer;
   communicating, by the first device to the second device, the trailer;
   detecting, with respect to processing the data packet, an error event; and
   constructing, in response to detecting the error event and in advance of communicating, the trailer, the trailer configured to indicate the error event through the inclusion of packet size information, synchronization data, packet number, communication protocol, destination address, originating address, error severity, error date and evaluation report information within the trailer.

2. The method of claim 1, further comprising:
   constructing, without a header, the first portion of processed data; and
   communicating, without the header, the first portion of processed data.

3. The method of claim 2, further comprising:
   constructing, without a set of validity information, the first portion of processed data; and
   communicating, without the set of validity information, the first portion of processed data.

4. The method of claim 1, further comprising:
   communicating the second portion of processed data separate from the trailer, wherein the trailer is communicated subsequent to the second portion of processed data.

5. The method of claim 1, further comprising:
   communicating, by the first device to the second device, the first and second portions of the processed data and the trailer using a first-in-first-out (FIFO) buffer to carry-out a FIFO technique.

6. The method of claim 1, wherein the threshold memory size is a fraction of a data packet size of the data packet.

7. The method of claim 1, further comprising:
   providing, in the trailer, a control command to discard the first and second portions of the processed data.

8. The method of claim 1, wherein the first and second devices are different micro-controller components that execute software.

9. The method of claim 1, further comprising:
   establishing, in the trailer, a magic word which indicates to the second device a start of the trailer.

10. The method of claim 1, wherein the memory-constrained environment includes an Internet-of-Things (IoT) environment.

11. The method of claim 1, wherein the memory-constrained environment includes a sensor network environment.

12. The method of claim 1, further comprising:
   introducing, to the memory-constrained environment, a protocol to transmit a response having processed data without a header in advance of the trailer having a set of validity information.

13. The method of claim 1, wherein the operational steps each occur in a dynamic fashion to streamline data packet management.

14. The method of claim 1, wherein the operational steps each occur in an automated fashion without user intervention.

15. The method of claim 1, wherein the threshold memory size is a fraction of a data packet size of the data packet, further comprising:
   constructing, without a header, the first portion of processed data;
   constructing, without a set of validity information, the first portion of processed data; communicating, without the header, the first portion of processed data; communicating, without the set of validity information, the first portion of processed data;
   detecting, with respect to processing the data packet, an error event;
   constructing, in response to detecting the error event and in advance of communicating the trailer, the trailer to indicate the error event;
   providing, in the trailer, a control command to discard the first and second portions of the processed data;
   communicating the second portion of processed data together with the trailer in a unified fashion having the trailer subsequent to the second portion of processed data; and
   communicating, by the first device to the second device, the first and second portions of the processed data and the trailer using a first-in-first-out (FIFO) buffer to carry-out the FIFO technique.

16. A system for data packet management in a memory-constrained environment, the memory-constrained environment including a distributed device driver environment, the system comprising:

a memory having a set of computer readable computer instructions, and a processor for executing the set of computer readable instructions, the set of computer readable instructions including:

receiving, by a first device that is a self boot engine (SBE), the first device including a memory component having an actual memory size which is less than a threshold memory size, a data packet having a command;

processing, by the first device using the command, the data packet;

loading, in the memory component by the first device, a first portion of processed data;

communicating, by the first device to a second device that is a service processor (SP), the first portion of processed data; loading, in the memory component by the first device, a second portion of processed data, wherein a combined size of the first and second portions of processed data exceeds the actual memory size;

communicating, by the first device to the second device, the second portion of processed data;

loading, in the memory component by the first device, a trailer;

communicating, by the first device to the second device, the trailer;

detecting, with respect to processing the data packet, an error event; and constructing, in response to detecting the error event and in advance of communicating, the trailer, the trailer configured to indicate the error event through the inclusion of packet size information, synchronization data, packet number, communication protocol, destination address, originating address, error severity, error date and evaluation report information within the trailer.

17. A computer program product for data packet management in a memory-constrained environment, the memory-constrained environment including a distributed device driver environment, the computer program product comprising a computer readable storage medium having program instructions embodied therewith, wherein the computer readable storage medium is not a transitory signal per se, the program instructions executable by a processor to cause the processor to perform a method comprising:

receiving, by a first device that is a self boot engine (SBE), the first device including a memory component having an actual memory size which is less than a threshold memory size, a data packet having a command;

processing, by the first device using the command, the data packet;

loading, in the memory component by the first device, a first portion of processed data;

communicating, by the first device to a second device that is a service processor (SP), the first portion of processed data;

loading, in the memory component by the first device, a second portion of processed data, wherein a combined size of the first and second portions of processed data exceeds the actual memory size;

communicating, by the first device to the second device, the second portion of processed data;

loading, in the memory component by the first device, a trailer;

communicating, by the first device to the second device, the trailer;

detecting, with respect to processing the data packet, an error event; and constructing, in response to detecting the error event and in advance of communicating, the trailer, the trailer configured to indicate the error event through the inclusion of packet size information, synchronization data, packet number, communication protocol, destination address, originating address, error severity, error date and evaluation report information within the trailer.

18. The computer program product of claim 17, wherein the program instructions are stored in the computer readable storage medium in a data processing system, and wherein the program instructions were downloaded over a network from a remote data processing system.

19. The computer program product of claim 17, wherein the program instructions are stored in the computer readable storage medium in a server data processing system, and wherein the program instructions are downloaded over a network to the remote data processing system for use in a second computer readable storage medium with the remote data processing system.

20. The method of claim 1, wherein the first device that is an SBE configured to perform the command contained in the data packet.

* * * * *